(12) United States Patent
Tabira

(10) Patent No.: US 7,380,037 B2
(45) Date of Patent: May 27, 2008

(54) DATA TRANSMITTER BETWEEN EXTERNAL DEVICE AND WORKING MEMORY

(75) Inventor: Yoshihiro Tabira, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 82 days.

(21) Appl. No.: 11/400,531

(22) Filed: Apr. 10, 2006

(65) Prior Publication Data

US 2006/0236009 A1    Oct. 19, 2006

(30) Foreign Application Priority Data

Apr. 14, 2005   (JP)   ............ 2005-117337

(51) Int. Cl.
G06F 13/10  (2006.01)
G06F 13/24  (2006.01)
G06F 38/38  (2006.01)
G06F 12/00  (2006.01)
G06F 7/00   (2006.01)

(52) U.S. Cl. .......... 710/241; 711/203; 711/206; 712/31; 712/32

(58) Field of Classification Search ........ 710/110, 710/305, 113, 309, 240, 241, 107, 36, 310, 710/306; 711/200, 203–206; 370/257, 492, 370/447; 712/31–32, 38; 345/519–522
See application file for complete search history.

(56) References Cited

U.S. PATENT DOCUMENTS

| | | | | |
|---|---|---|---|---|
| 4,562,537 A | * | 12/1985 | Barnett et al. ............ | 712/221 |
| 5,463,740 A | * | 10/1995 | Taniai et al. ............. | 710/119 |
| 5,778,206 A | * | 7/1998 | Pain et al. ............... | 710/305 |
| 7,225,287 B2 | * | 5/2007 | Wooten .................. | 710/309 |
| 2003/0046499 A1 | * | 3/2003 | Lin ....................... | 711/154 |
| 2005/0030311 A1 | * | 2/2005 | Hara et al. .............. | 345/520 |
| 2005/0080972 A1 | * | 4/2005 | Endo .................... | 710/306 |
| 2005/0273538 A1 | * | 12/2005 | Teranuma et al. ........ | 710/110 |
| 2006/0236009 A1 | * | 10/2006 | Tabira .................. | 710/110 |
| 2006/0294285 A1 | * | 12/2006 | Ahem .................. | 710/305 |
| 2007/0112993 A1 | * | 5/2007 | Teranuma et al. ........ | 710/309 |
| 2007/0180180 A1 | * | 8/2007 | Torigoe et al. .......... | 710/310 |
| 2007/0214341 A1 | * | 9/2007 | Das ..................... | 712/38 |

FOREIGN PATENT DOCUMENTS

| | | |
|---|---|---|
| JP | 2000-224195 | 8/2000 |
| JP | 2001-308951 | 11/2001 |

OTHER PUBLICATIONS

A CMOS 510 K-transistor single-chip token-ring LAN controller (TRC) compatible with IEEE802.5 MAC protocol by Kanuma et al. (abstract only) Publication Date: Feb. 1990.*

* cited by examiner

Primary Examiner—Gopal C. Ray
(74) Attorney, Agent, or Firm—McDermott Will & Emery LLP

(57) ABSTRACT

A data transmitter includes a bus master circuit. The bus master circuit obtains the right to use a CPU bus and directly performs data transmission to and from a working memory connected to the CPU bus through a CPU interface section and the CPU bus.

5 Claims, 4 Drawing Sheets

Data transmission to external device

Data read from working memory to memory transmitter

Data receipt from external device

Data write from memory transmitter to working memory

DATA TRANSMITTER BETWEEN EXTERNAL DEVICE AND WORKING MEMORY

CROSS-REFERENCE TO RELATED APPLICATION

This application claims priority under 35 USC §119 to Japanese Patent Application No. 2005-117337 filed on Apr. 14, 2005, the entire contents of all of which are incorporated herein by reference.

BACKGROUND OF THE INVENTION

The present invention relates to a data transmitter, and particularly relates to a technique for data transmission between an external device connected to a data transmitter by an IEEE 1394 bus or the like and a working memory connected to a CPU bus.

IEEE (Institute of Electrical and Electronic Engineers) 1394, which is a standard for performing device information (Config-ROM) exchange and command/data transfer using a virtual 48-bit address space on a single device (node), enables high-speed data transfer. In recent years, the IEEE 1394 has been adopted for the purpose of connecting a STB (set-top box) and a digital TV and thereby transferring EPG (electronic program guide) data. EPG data is large in size, and in menu manipulation using EPG, high-speed data transfer capability is demanded from the viewpoint of response speed.

A data transmitter having DMA transfer function is known as a high-speed high-capacity data transfer technique using the IEEE 1394. However, as shown in FIG. 4, in a typical structure for a digital TV and the like, a CPU 110, a working memory 120, and a data transmitter are connected on a CPU bus (local bus) 100. Therefore, in the conventional data transmitter, a DMA interface section 210 for performing DMA transfer accesses the working memory 120 through a CPU interface section 10 and the CPU bus 100.

FIGS. 5A and 5B show timings for the CPU bus access by the data transmitter shown in FIG. 4. FIG. 5A is a timing chart for data transmission to an external device, while FIG. 5B is a timing chart for data receipt from the external device. In the data transmitter shown in FIG. 4, data read from and data write to the working memory 120 and data write to and data read from the data transmitter occur alternately, thereby causing the performance of the data transmission to deteriorate.

In addition, data stored in a contiguous area in the memory space in the external device is not always stored in a contiguous area in the working memory 120, and when it is separated into a plurality of portions to be stored in a plurality of discontiguous areas in the working memory 120, correlations between virtual addresses in the external device and real addresses in the working memory 120 have to be established. This correlation-establishment also causes the performance of the data transmission to deteriorate.

The performance deterioration in the data transmission described above produces problems in that when EPG data is transferred from a STB to a digital TV using the IEEE 1394, for example, screen display is delayed or response of the menu manipulation slows down.

SUMMARY OF THE INVENTION

In view of the above problems, it is therefore an object of the present invention to improve data transmission performance of a data transmitter which carries out data transmission between an external device connected to the data transmitter by a bus such as an IEEE 1394 and a working memory connected to a CPU bus.

In order to achieve the object, an inventive data transmitter for performing data transmission between an external device connected to the data transmitter by a first bus and a working memory connected to a second bus to which a CPU is connected includes: a CPU interface section connected to the second bus; and a bus master circuit for obtaining right to use the second bus and performing data transmission to and from the working memory through the CPU interface section and the second bus.

According to the present invention, it is possible for the bus master circuit to obtain the right to use the second bus, to which the CPU is connected, and directly access the working memory connected to the second bus. This improves the performance of data transmission between the external device connected by the first bus and the working memory connected to the second bus.

The data transmitter preferably further includes an information table for storing therein address conversion information about conversion from a virtual address related to a request made by the external device to a real address in the working memory and transmission information corresponding to the address conversion information and indicating the amount of data to be transmitted to or from the working memory, wherein the bus master circuit transmits the data in that amount indicated by the transmission information to the real address obtained by the conversion performed referring to the address conversion information.

Furthermore, the address conversion information and the transmission information are preferably updated during idle time in a transaction performed after the transmission of that amount of data indicated by the transmission information is completed.

Also, the information table preferably stores a plurality of sets of information each containing the address conversion information and the transmission information; and preferably, the bus master circuit successively selects one of the information sets and transmits data in an amount indicated by the transmission information in the selected set to a real address obtained by conversion performed referring to the address conversion information in the selected set.

The bus master circuit preferably performs a burst transfer to and from the working memory; and the data transmitter preferably further includes a cache for temporally storing data related to the burst transfer.

The data transmitter preferably further includes a function selection section for selecting either validity or invalidity of the data transmission by the bus master circuit.

As described above, according to the present invention, data transmission is directly performed between an external device connected by a bus such as IEEE 1394 and a working memory connected to a bus to which the CPU is connected, whereby the performance of the data transmission is improved. Therefore, in a system in which a STB and a digital TV are connected, for example, the speed of EPG data transmission is increased and reaction of the menu manipulation speeds up, thereby realizing excellent operation.

DETAILED DESCRIPTION OF THE INVENTION

Hereinafter, preferred embodiments of the present invention will be described with reference to the accompanying drawings.

Figure 1:
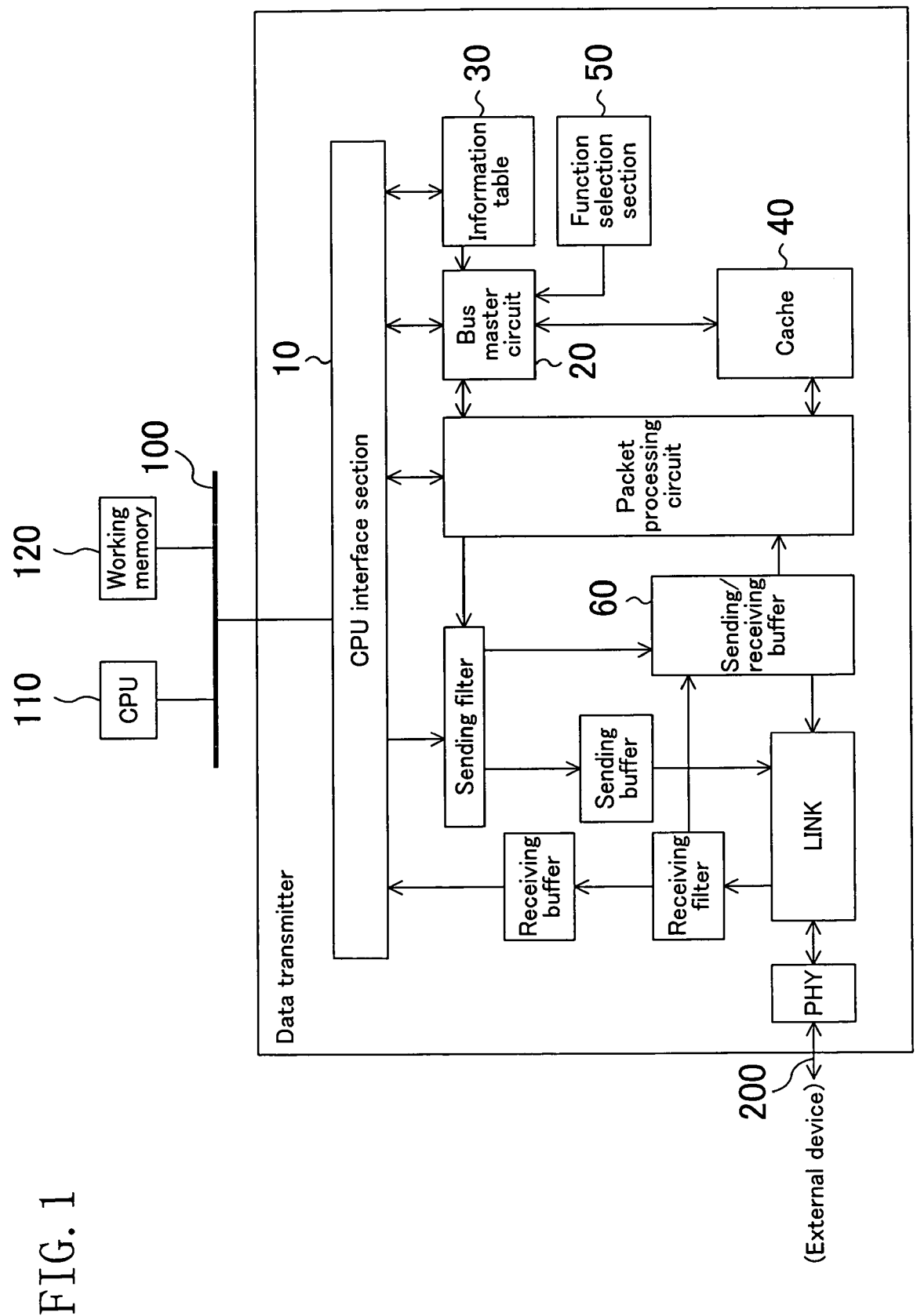
FIG. 1 illustrates the structure of a data transmitter according to an embodiment of the present invention.

FIG. 1 illustrates a data transmitter according to an embodiment of the present invention. The data transmitter of this embodiment includes a bus master circuit 20, an information table 30, a cache 40, and a function selection section 50.

The bus master circuit 20 obtains the right to use a CPU bus 100 to directly perform data transmission to or from a working memory 120 through a CPU interface section 10 and the CPU bus 100. In this case, the bus master circuit 20 refers to the information table 30 and converts a virtual address related to a request made from an external device to a real address in the working memory 120. The bus master circuit 20 then performs transmission of data in an amount indicated by transmission information stored in the information table 30 to or from this real address. More specifically, the bus master circuit 20 counts (counts up or counts down) the amount of data transmitted to or from the working memory 120 with the converted real address being the starting address, and when this count value reaches the amount indicated by the transmission information, the bus master circuit 20 completes the data transmission.

Figure 2A:
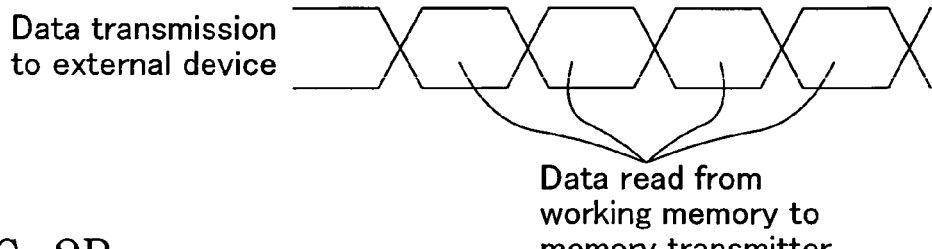
FIGS. 2A and 2B are timing charts for CPU bus access by the data transmitter shown in FIG. 1.
Figure 2B:
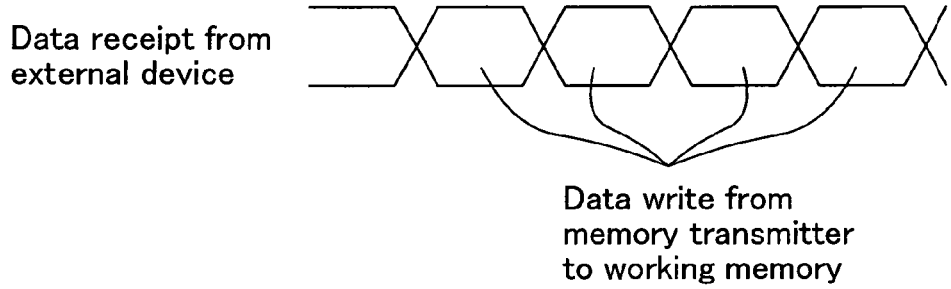
Figure 5A:
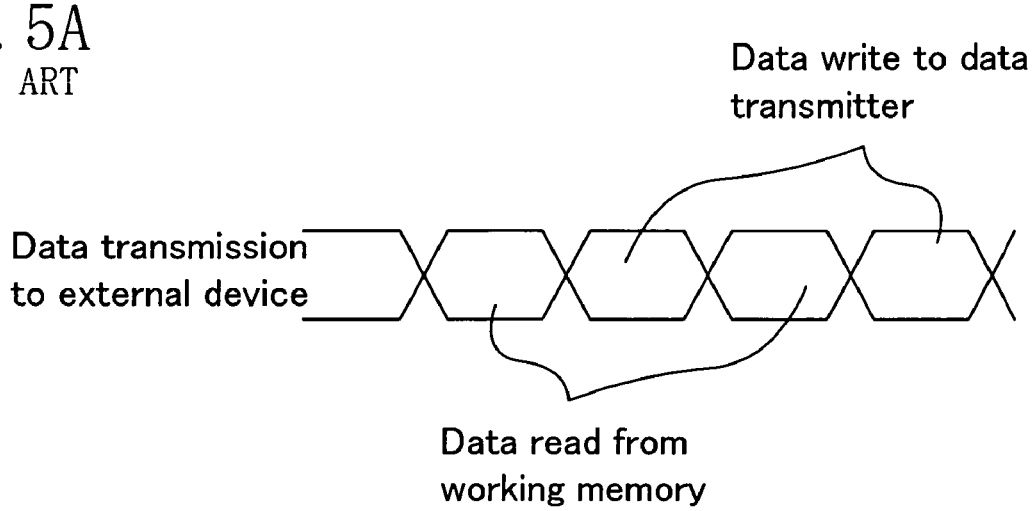
FIGS. 5A and 5B are timing charts for CPU bus access by the data transmitter shown in FIG. 4.
Figure 5B:
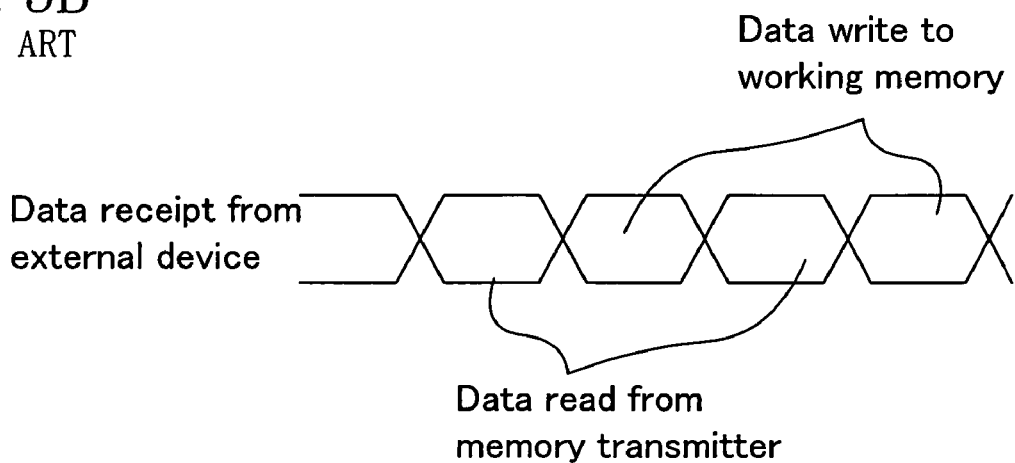

FIGS. 2A and 2B indicate timings for the CPU bus access by the data transmitter of this embodiment. FIG. 2A is a timing chart for data transmission to the external device, while FIG. 2B is a timing chart for data receipt from the external device. In the data transmitter of this embodiment, since the bus master circuit 20 obtains the right to use the CPU bus 100 and directly accesses the working memory 120, data read from and data write to the working memory 120 and data write to and data read from the data transmitter do not occur alternately (see FIG. 5, for example). This enables the data transmitter to access the working memory 120 at higher speed.

The information table 30 stores therein address conversion information and transmission information. The address conversion information is used to convert a virtual address in the external device connected by an IEEE 1394 bus 200 into a real address in the working memory 120. The transmission information indicates the amount of data to be transmitted to the converted real address. The address conversion information and the transmission information are updated by a CPU 110 each time the bus master circuit 20 carries out data transmission, and are initialized when the data transmitter is started.

Figure 3:
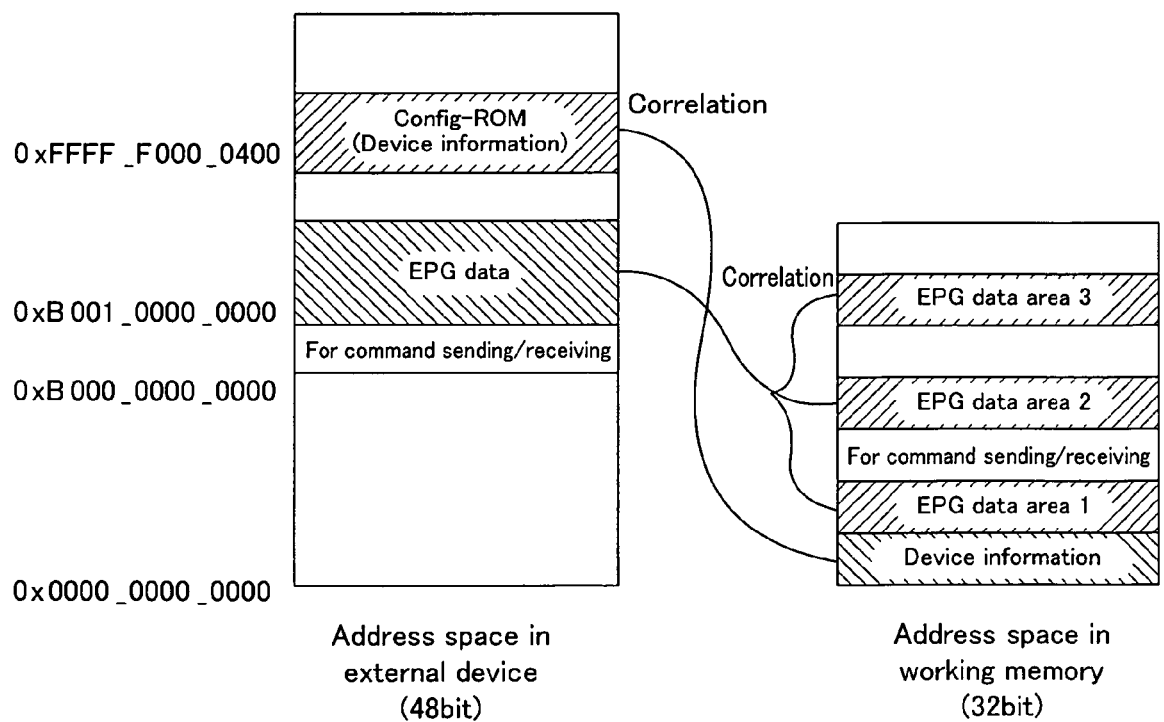
FIG. 3 indicates an example of correlation between an address space in an external device and an address space in a working memory.
Figure 4:
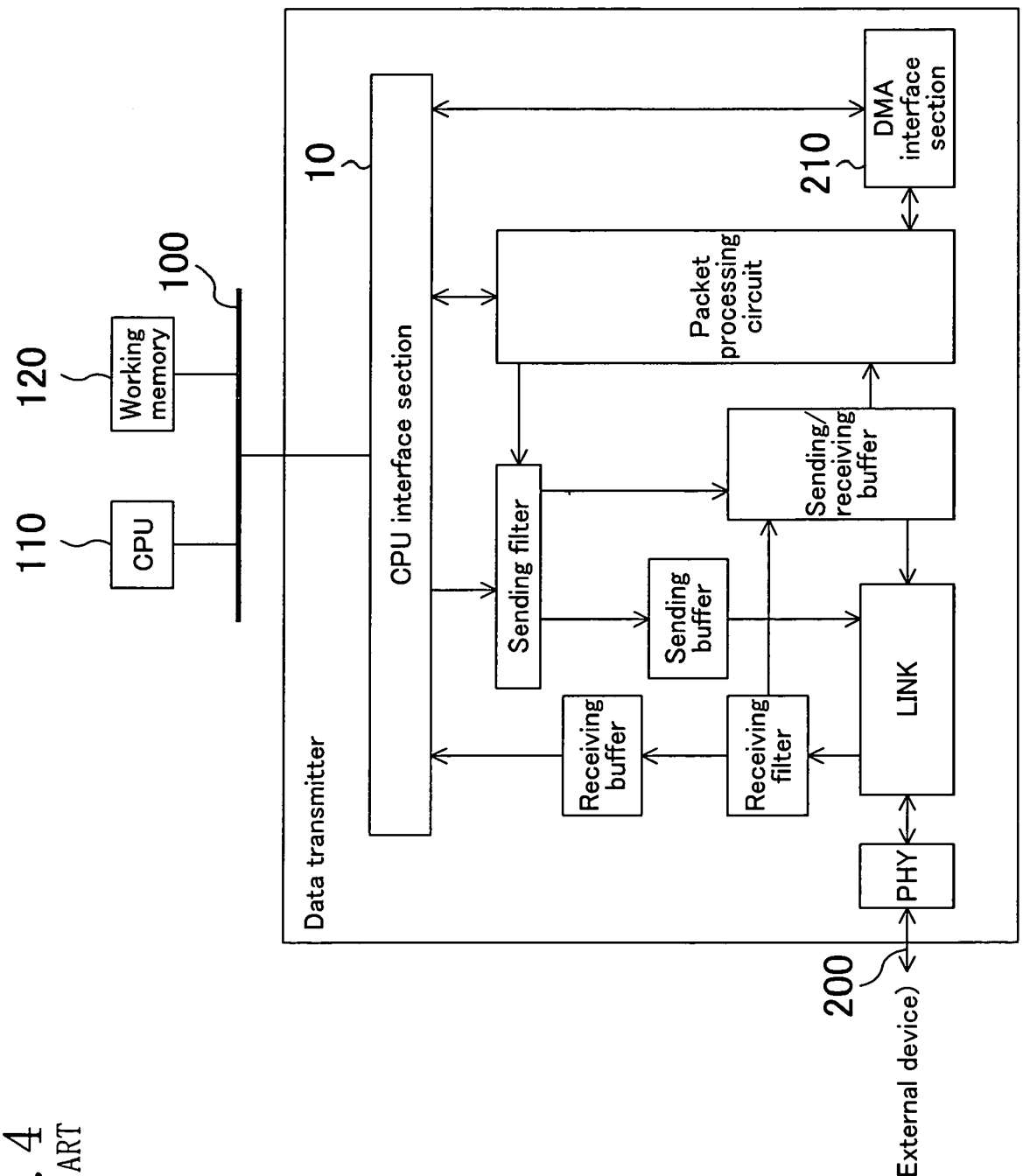
FIG. 4 illustrates the structure of a conventional data transmitter.

FIG. 3 indicates an example of correlation between the address space in the external device and the address space in the working memory. As shown in FIG. 3, for example, the 48-bit address space is defined in the external device based on the IEEE 1394 standard, while the address space in the working memory 120 is typically 32 bits. In the information table 30, address offset and the like are stored as the address conversion information about the conversion from a virtual address in the external device to a real address in the working memory 120.

For instance, when an external device has made a request for device information about a different external device, address conversion information about the conversion from the virtual address of the device information (Config-ROM) in the different external device to a real address in the working memory 120 and transmission information indicating the amount of data in that device information are written into the information table 30. The bus master circuit 20 refers to the information table 30 and directly accesses the device information area in the working memory 120 to read the device information. The read device information is transmitted to the requesting external device, after packet processing or the like is performed for the device information. Therefore, even if the device information is variable-length data, the singe request for the device information enables reading of all of that device information stored in the working memory 120. This, together with the increased speed of access to the working memory 120, allows the time required for the device authentication to be shortened.

Data of relatively large size, such as EPG data, is sometimes stored in discontiguous areas in the working memory 120. For example, in FIG. 3, EPG data is divided and stored in three areas in the working memory 120. In this case, for each of the discontiguous EPG data areas in the working memory 120, a set of information composed of address conversion information and transmission information indicating the size of that area is written into the information table 30. The bus master circuit 20 refers to the information table 30, successively selects each information set that includes the address conversion information and the transmission information, and directly accesses each of the EPG data areas in the working memory 120 to send/receive the EPG data. In this manner, the plurality of information sets, each containing the address conversion information and the transmission information on the corresponding discontiguous area in the working memory 120, are stored in the information table 30, whereby the bus master circuit 20 is allowed to perform continuous data transmission to and from the discontiguous areas, thereby improving the performance of the data transmission.

Even if the information table 30 has a structure in which only a single set of information composed of address conversion information and transmission information can be stored, continuous data transmission such as described above can be realized by performing the following steps.

(1) When a request is made from the external device, address conversion information and transmission information for the starting area of the discontiguous areas in the working memory 120 are set in the information table 30.

(2) When the bus master circuit 20 completes the transmission of the starting area data, address conversion information and transmission information for the next area are set in the information table 30 and the data transmission by the bus master circuit 20 is restarted.

(3) The step (2) is repeated until data in the last area of the discontiguous areas in the working memory 120 is transmitted.

Then, the discontiguous data in the working memory 120 is transmitted by the one request made from the external device.

Data transmission is typically realized by a transaction using write request packets and acknowledgement packets. It is therefore preferable that the bus master circuit 20 be restarted during idle time in the transaction. Then, very efficient data transmission is realized in which the data transmission to/from the external device is not interrupted.

In a system such as a digital TV, the frequency of an external clock of the CPU bus 100 is higher than that of an internal clock of the data transmitter. That is, the speed of memory access by the CPU interface section 10 is faster than the speed of data buffering by a sending/receiving buffer 60. Therefore, if burst transfer is performed between the bus master circuit 20 and the working memory 120, more efficient data transmission is realized. When the bus master circuit 20 performs burst transfer between the working memory 120 and the bus master circuit 20, the cache 40 is used to temporally store data related to the burst transfer. Specifically, the cache 40 reduces deterioration in performance caused by the difference between the speed of data buffering by the sending/receiving buffer 60 and the speed of memory access by the CPU interface section 10, thereby realizing higher-speed data transmission. The capacitance of the cache 40 may be smaller than that of the sending/receiving buffer 60.

The function selection section 50 selects either the validity or invalidity of data transmission by the bus master circuit 20. More specifically, the function selection section 50 can select whether or not the data transmission by the bus master circuit 20 is performed. The function selection section 50 is realized by a terminal or an internal register in a semiconductor integrated circuit, for example.

The cache 40 and the function selection section 50 may be particularly omitted from the data transmitter. Also, the interface to the external device may be not only the IEEE 1394 but also the USB (Universal Serial Bus), the HDMI (High-Definition Multimedia interface) and the like.

What is claimed is:

1. A data transmitter for performing data transmission between an external device connected to the data transmitter by a first bus and a working memory connected to a second bus to which a CPU is connected; the data transmitter comprising:

a CPU interface section connected to the second bus;

a bus master circuit for obtaining right to use the second bus and performing data transmission to and from the working memory through the CPU interface section and the second bus; and an information table for storing therein address conversion information about conversion from a virtual address related to a request made by the external device to a real address in the working memory and transmission information corresponding to the address conversion information and indicating the amount of data to be transmitted to or from the working memory, wherein the bus master circuit transmits the data in that amount indicated by the transmission information to the real address obtained by the conversion performed referring to the address conversion information.

2. The data transmitter of claim 1, wherein the address conversion information and the transmission information are updated during idle time in a transaction performed after the transmission of that amount of data indicated by the transmission information is completed.

3. The data transmitter of claim 1, wherein the information table stores a plurality of sets of information each containing the address conversion information and the transmission information; and the bus master circuit successively selects one of the information sets and transmits data in an amount indicated by the transmission information in the selected set to a real address obtained by conversion performed referring to the address conversion information in the selected set.

4. The data transmitter of claim 1, wherein the bus master circuit performs a burst transfer to and from the working memory; and the data transmitter further includes a cache for temporally storing data related to the burst transfer.

5. The data transmitter of claim 1, further comprising a function selection section for selecting either validity or invalidity of the data transmission by the bus master circuit.

* * * * *